F. W. VOLKMAN.
Stench-Traps.

No. 198,501.

Patented Dec. 25, 1877.

WITNESSES:

INVENTOR:
Frederich W. Volkman

UNITED STATES PATENT OFFICE.

FREDRECH W. VOLKMAN, OF SAN FRANCISCO, CALIFORNIA.

IMPROVEMENT IN STENCH-TRAPS.

Specification forming part of Letters Patent No. 198,501, dated December 25, 1877; application filed May 12, 1877.

*To all whom it may concern:*

Be it known that I, FREDRECH W. VOLKMAN, of the city and county of San Francisco, and State of California, have invented certain Improvements in Stench-Traps for House-Drains, of which the following is a specification:

My invention consists of a hinged valve, which, by means of its weight, is self-closing, arranged obliquely within and acting as the shut-off in a stench-trap, and two shells or sections of pipes, joined together, and forming the outer covering of said trap.

Figure 1:
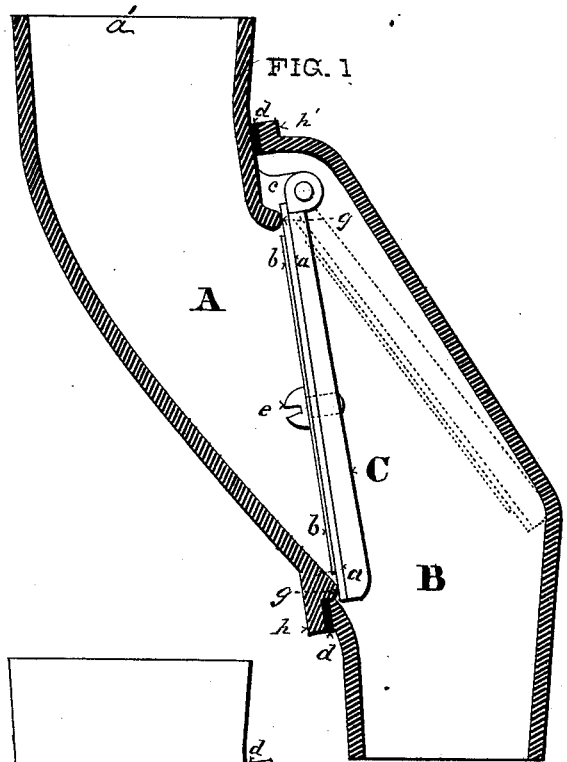
Figure 2:
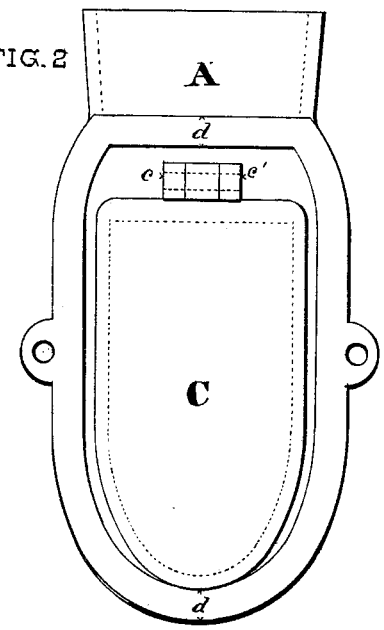
Figure 3:
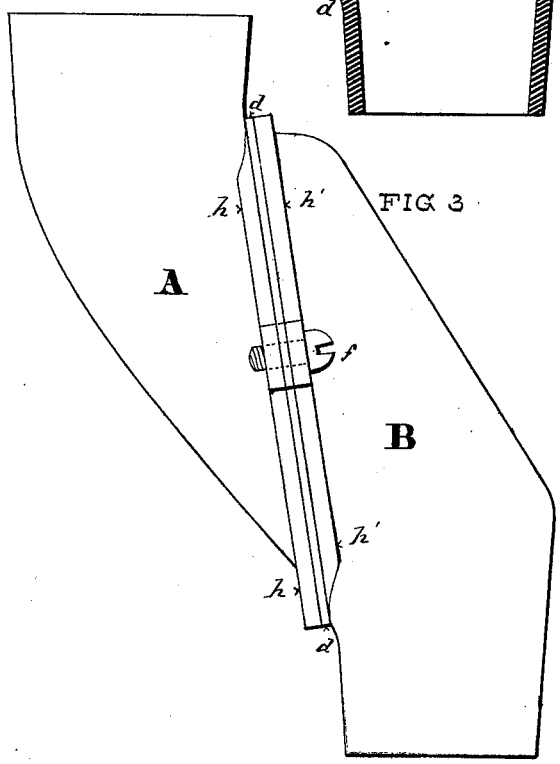
Figure 4:
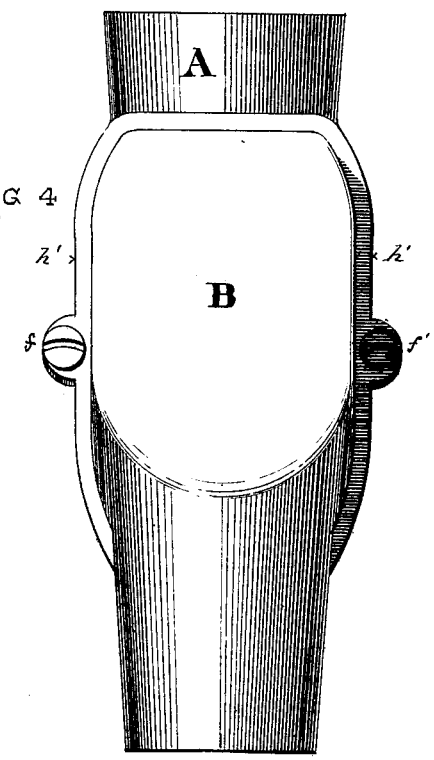

Figure 1 is a longitudinal section of the trap, showing an edge view of the valve C; Fig. 2, a view of the receiving-shell A, the shell B being removed, showing the general plan of the valve C. The dotted lines within the outline of the valve show the form of the lower aperture of the shell A. Fig. 3 is an elevation of the trap, shown in the same position as at Fig. 1; Fig. 4, an elevation of the trap, shown in the same position as at Fig. 2.

The upper portion of the receiving-shell A is enlarged in a cone-shaped neck, $a'$, to receive the upper drain-pipe, and the lower portion of the discharging-shell B is contracted in a cone shape for its entrance into the lower drain-pipe.

When the trap is applied to wash-stands in bed-rooms, where a perfect shut-off of sewer-gas is requisite, a rubber washer, $a\ a$, Fig. 1, may be attached to the valve C by means of a piece of tin, $b\ b$, the whole secured by the screw $e$, or by a smooth-headed bolt and nut. In the application of the trap to a kitchen-sink, however, this precaution is unnecessary, as a thin coating of grease soon forms about the raised rim or valve-seat $g\ g$, effectually preventing the rise of gases. In either case the valve must be hung to the fixed lugs $c\ c$, so as to fall and rest evenly on the valve-seat, Figs. 1 and 2.

The shells A and B are each provided with even-faced flanges $h\ h$ and $h'\ h'$, between which is placed a rubber washer, $d\ d$, Figs. 1, 2, and 3. The flanges are provided with lugs, through which the screws $f\ f'$ are inserted, securing the shells A and B together, Fig. 4.

The trap may be constructed of the metals generally used in stench-traps.

I claim as my invention—

The shells A and B, attached to one another by the screws $f\ f'$, the shell A being provided with a funnel-shaped neck or inlet $a'$, valve $c$, hung nearly vertical, and the flange $h\ h$, and the shell B provided with a contracted outlet and flange, $h'\ h'$, the said flanges having a washer interposed.

FREDRECH W. VOLKMAN.

Witnesses:
VITMONIS FRAZEE,
JOHN H. PITTS.